US006189281B1

(12) United States Patent
Sobek

(10) Patent No.: US 6,189,281 B1
(45) Date of Patent: Feb. 20, 2001

(54) INJECTION ANCHOR

(75) Inventor: Peter Sobek, Rödermark (DE)

(73) Assignee: International Intec Patent Holding Establishment, Liechtenstein ( * ) Notice: Under 35 U.S.C. 154(b), the term of this patent shall be extended for 0 days.

(21) Appl. No.: 09/134,749

(22) Filed: Aug. 14, 1998

(51) Int. Cl.$^7$ ........................... E04G 23/02; E02D 37/00; E21D 20/00
(52) U.S. Cl. .................. 52/514.5; 52/742.14; 52/742.16; 405/259.5
(58) Field of Search .................................... 52/698, 223.1, 52/707, 514.5, 745.21, 741.3, 741.15, 742.14, 742.15, 742.16; 405/259.1, 259.5, 259.6

(56) References Cited

U.S. PATENT DOCUMENTS

| | | | |
|---|---|---|---|
| 4,343,399 | * | 8/1982 | Patel et al. .......................... 405/259.6 |
| 4,386,876 | * | 6/1983 | Dupeuble ............................ 405/259.5 |
| 4,836,729 | * | 6/1989 | Bisping et al. .................... 405/259.5 |

* cited by examiner

Primary Examiner—Michael Safavi
(74) Attorney, Agent, or Firm—Daniel D. Wasil; Ralph E. Jocke; Walker & Jocke

(57) ABSTRACT

An injection or grouting body for the transfer of mechanical stresses in structures in above-ground or below-ground construction, and for insertion into a borehole, in slits or similar openings, has a centrally-arranged filling tube and at least one fabric stocking surrounding the filling tube. The filling tube is embodied as a fabric stocking and one or a plurality of reinforcing wires and/or rods, and/or pipes and/or ridged sheet metal strips are arranged on site so as to be adaptable, axis-parallel between the fabric stockings. An outer closed fabric stocking is arranged along the axis of the injection body about its inner filling tube (Fabric tube) that is open at its lower end. The reinforcing wires or rods are arranged on the outside of the inner fabric stocking and are attached to the fabric of the outer stocking in such a way that it can be ensured that, following filling or grouting, the reinforcement will remain in position.

17 Claims, 4 Drawing Sheets

5  1  2  3  4

1  6  7

8

9

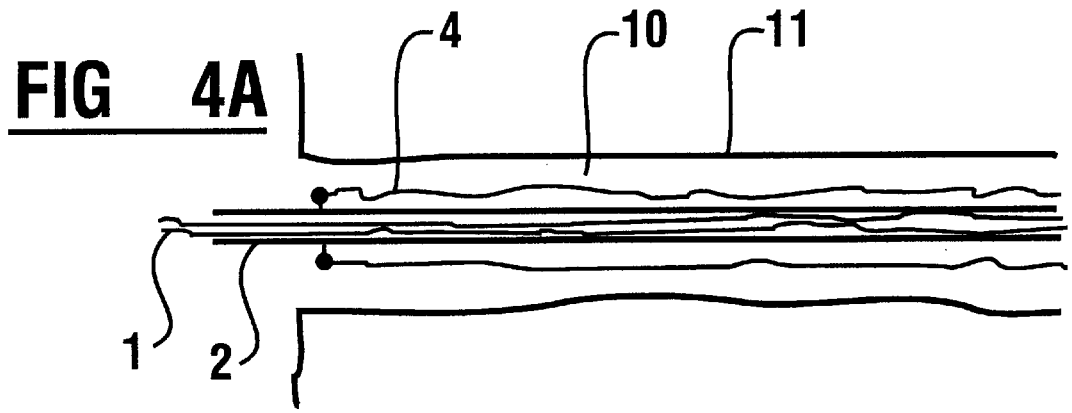
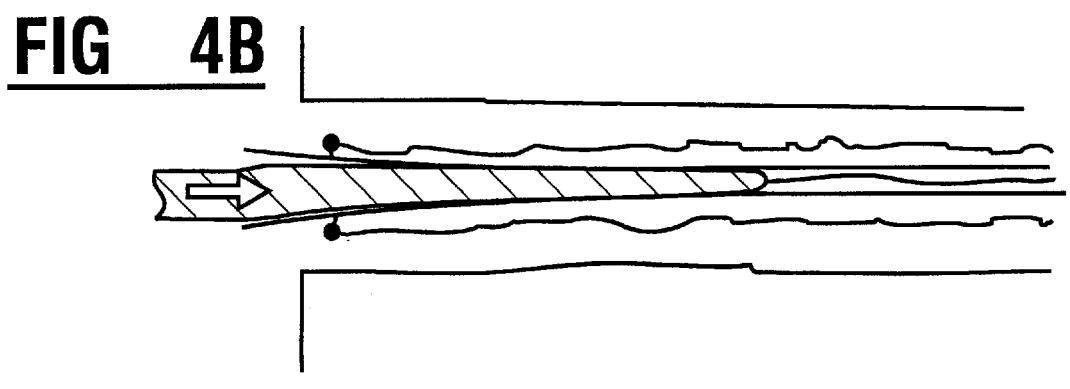
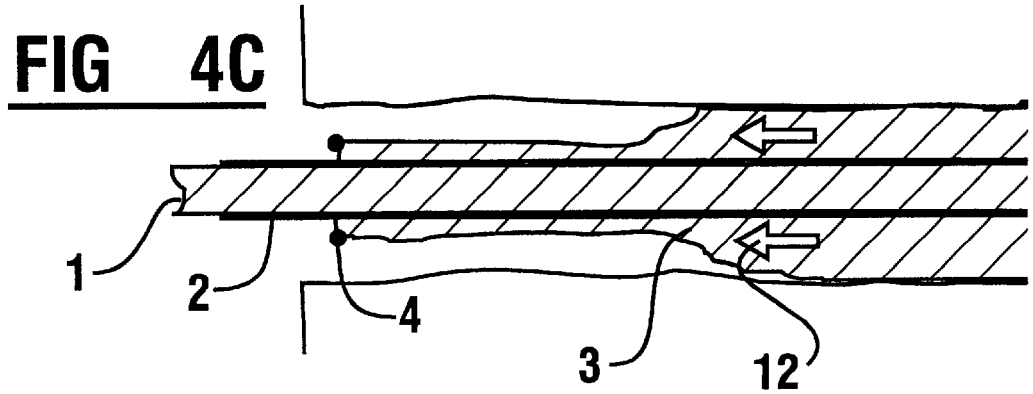
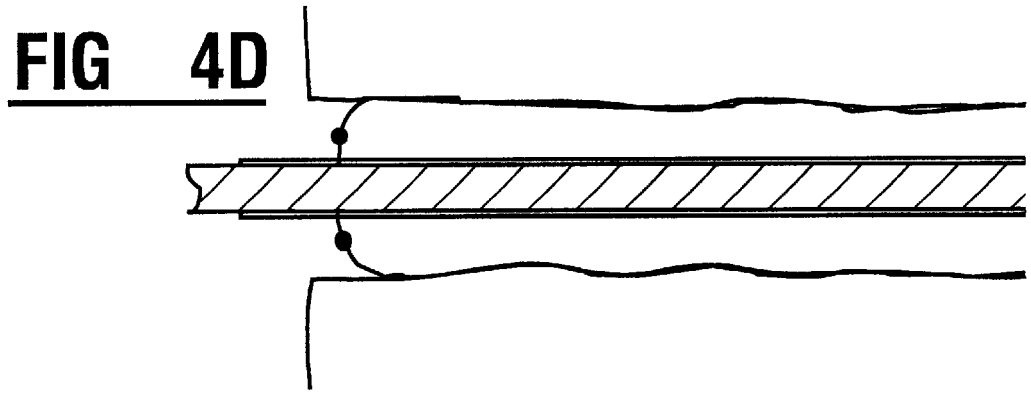

INJECTION ANCHOR

TECHNICAL FIELD

This invention relates to anchoring devices, more specifically, the invention relates to an injection or grouting body which, comprising a centrally-arranged filling tube and at least one fabric stocking surrounding the filling tube, is inserted into a borehole, into slits or similar openings in order to transfer mechanical stresses in structures in above- and under-ground construction.

BACKGROUND ART

So-called injection or grouting anchors are used to secure construction components to unstable backgrounds, strengthen structures on construction sites and render safe buildings that have been threatened by damage caused by mining. As disclosed in DIN 4125, used in such cases are construction elements in respect of which a grouting body, having been created by the forcing of grout around the rear part of a steel stress member installed in the ground, is attached via steel stress members and anchor head to the construction component or mine component to be anchored.

Another important application is the anchoring of damaged masonry or concrete sections in above-ground construction, bridge construction or below-ground construction. Injection or grouting anchors are also used in tunnel construction to anchor inner tunnel linings, and in mines to help compact galleries and secure suspended ceilings. This type of grouting anchor is described, for example, in DIN 4125 and 4128.

If, for example, excessive loads or moments have to be dispersed in certain regions over predetermined lengths or borehole depths, the prior art injection or grouting anchors are not suitable or not particularly suitable. The prior art injection or grouting anchors are factory manufactured, which means that the borehole depths, which are selected to ensure special stress or load dispersal, must be known at the time the anchor is being manufactured, which entails significant production problems, since the anchors have to be made to order. Mass production is not possible in this case. Thus there exists a need for an improved anchor and methods of installation thereof.

DISCLOSURE OF INVENTION

The object of the invention is the creation of an injection or grouting body that can be adapted on site to local requirements and be easily assembled, installed and immediately employed at the construction site. It is proposed that this object be addressed by an injection or grouting body of the type first described, wherein the filling tube is designed as a tube of fabric or similar material and wherein arranged axis-parallel between the fabric stockings are at least two reinforcing wires and/or rods and/or pipes/ and/or ridged sheet metal strips.

This type of injection or grouting body thus comprises a small number of conventional elements that can be readily installed at the construction site and adapted to local conditions.

Both the length of the grouting body and the adaptation to the desired stress or load dispersal can be easily determined on site, for example through the selection of the number and cross sections of the reinforcing elements to be employed.

Since the preferred design of the fabric stocking mesh permits only a relatively small amount of filler to escape radially, the latter expands to force the reinforcing wires, rods, pipes or ridged sheet metal strips, which are disposed around the fabric stocking, against the outer circumference.

In another embodiment of the invention, the reinforcing wires and/or rods and/or pipes disposed on the outside of the inner fabric stocking are attached at points to the fabric of the stocking so as to ensure that the reinforcing elements will remain in position after the anchor has been filled.

It is proposed that the outer and/or inner fabric stocking be designed to expand and adapt to the borehole, which must be laid out in anticipation of the loads to be dispersed or the stresses to be displaced. This arrangement permits the same basic elements considerable scope for adapting the injection or grouting body.

In a further embodiment of the invention, the fabric stockings are embodied at least in sections as a metal fabric mesh, an arrangement that broadens considerably the range of applicability. The mesh fabric embodiments of this arrangement is, for example, designed of very fine wires or metal fibres which, owing to their looped arrangement, can expand up to about 20% of the circumference of the stocking.

The inner fabric stocking is advantageously slightly shorter than the reinforcing wires, rods, pipes or ridged sheet metal, so that the filler is permitted to flow up to the end of the inner fabric tube, from thence out to the inside of the outer fabric tube, which, being closed, causes the filler to flow back up into the region of the filling entrance and out of the borehole, an indication that filling of the injection body has been successfully completed.

In a further variant of the invention, the wires and/or rods are designed in a U-shape, or other comparably acting contour, whereby their bent positions are preferably arranged at one end of the injection or grouting body. The reinforcing elements of the injection or grouting body are disposed in its peripheral region. Further advantages of this variant are realized because of the significantly increased resistance afforded by such a wire or rod bundle against being pulled out.

In order to increase resistance against being pulled out, the reinforcing wires and/or rods and/or pipes are preferably designed to be at least partially deformed over at least a part of their length.

Another variant of the invention comprises that each reinforcing wire and/or rod and/or pipe or a group of wires and/or rods and/or pipes have deformations or other comparably acting features at predetermined locations over a predetermined length for the purposes of stress displacement or load and/or moment dispersal from defined zones.

If, for example, load or moment dispersal is required in certain serially-disposed regions of varying sizes, wires, pipes or rods, whose thickness and number can be selected in accordance with load or moment dispersal requirements, can be selected for each region, in which case a bundle of wires or rods is assembled for the purpose of dispersing load from a single region, while a further bundle of wires, pipes or rods takes over load or moment dispersal from another region. An advantage of this approach is that the tensile strength of a wire, pipe or rod bundle can be designed to meet the requirements and be exploited; in such a case, further loads do not generally act on this wire or rod bundle. In such an arrangement, even the individual load regions are not generally influenced by one another and a single injection body can thus displace or transfer loads or moments from various regions relatively independently of other regions.

In order to increase resistance against pulling-out, the wires and/or rods and/or pipes may have corrugations in the manner of a hair pin, and/or are twisted, or similarly configured, in which case the deformations are preferably provided in those locations and zones in which the individual loads or moments occur. Advantageously, in addition, either steel or glass wool or other comparable material can be twisted into the existing twists. Thus, the reinforcing elements may be corrugated or twisted in defined regions and attached to steel or glass wool.

The injection body as proposed also permits improvement of the filling procedure in that provided at the anchor head is an endplate or an adapter which, being attached to the reinforcing elements, can be connected to a vibrating device, an arrangement that permits the mechanical vibrations thus produced to be transmitted to the reinforcing elements.

This arrangement, by permitting transmission of vibrational energy to all regions of the injection anchor may further improve the flow capability of the filler. This arrangement permits the injection bodies to be produced in long lengths, without hampering filler injection. This procedure permits the production of anchors in lengths of 50 m or longer. This is one advantage resulting from the fact that this type of injection body can be produced on-site.

BRIEF DESCRIPTION OF DRAWINGS

Exemplary embodiments of the invention will next be described in greater detail with the aid of drawings. Shown are:

FIG. 4A shows a first phase in installing a reinforced injection body.

FIG. 4B shows a second phase in installing a reinforced injection body.

FIG. 4C shows a third phase in installing a reinforced injection body.

FIG. 4D shows a fourth phase in installing a reinforced injection body.

BEST MODES FOR CARRYING OUT INVENTION

Figure 1:
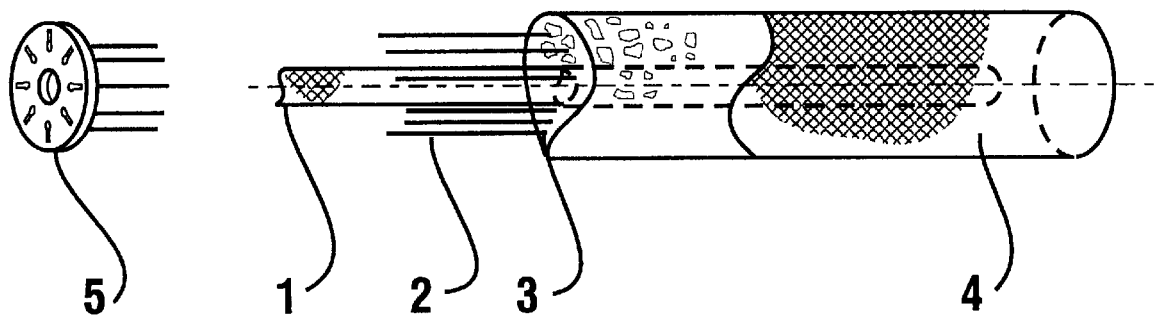
FIG. 1: an exploded perspective view of an injection body featuring a plurality of partial sections.

FIG. 1 shows in perspective an exploded view of an injection body as proposed in the filled state. The inner deformable structure which in the embodiment shown comprises fabric tube 1 is surrounded by reinforcing elements 2, which can comprise rods, wires, pipes or ridged sheet metal or other suitable elements. Reinforcing elements 2 in the present embodiment example comprise rods or bars, each of which is slightly shorter than the integral length of the injection body or can comprise partial pieces that are not indicated in greater detail. The length and cross section of the reinforcing elements 2 are determined at the construction site on the basis of the data available. Next, the assembled injection body is also installed. An additional fabric tube 4 or similar structure, which is closed at the foot-end of the injection body, surrounds the entire body. The inner fabric tube is correspondingly shorter, so that mortar 3 which has been introduced via the inner fabric tube, exits the inner fabric tube at the foot-end of the injection body, and runs along the inner wall of the outer fabric tube up to the head of the injection body, where in the described embodiment it exits, thus signalling that the grouting of the anchor has been completed. In order to better ensure the even or predetermined arrangement and position of the reinforcing elements, the latter can be attached to the outer wall of the inner fabric tube. The means of securing can comprise the same material as that of the fabric tube, for example, loops, into which the reinforcing elements are inserted. In this illustrated embodiment example, the reinforcing elements 2 are connected to an endplate or end pipe 5 at the head-part of the injection anchor. The fabric stocking 4 may be connected under tension to the external periphery of the endplate or end pipe 5. The inner fabric tube 1 may be connected to a center bore of the endplate or end pipe 5. This arrangement, first of all, permits fixing of the position of the reinforcing elements, as well as transmission of vibration energies so as to facilitate the installation process and also better ensure the distribution and solidification of the mortar. All types of known fibre materials can be used for the fabric tube, even metallic meshes. Inner and outer fabric tubes can also comprise different materials. Similarly, the outer fabric tube can be more elastic than the inner tube. This arrangement, for example, ensures that the inner tube completely fulfills its transport function, while the outer fabric tube readily adapts to the unevenness of its surroundings and thus for example completely fills in its borehole so that a transfer of the stresses or loads from the structure to the injection body is also ensured.

Figure 2:
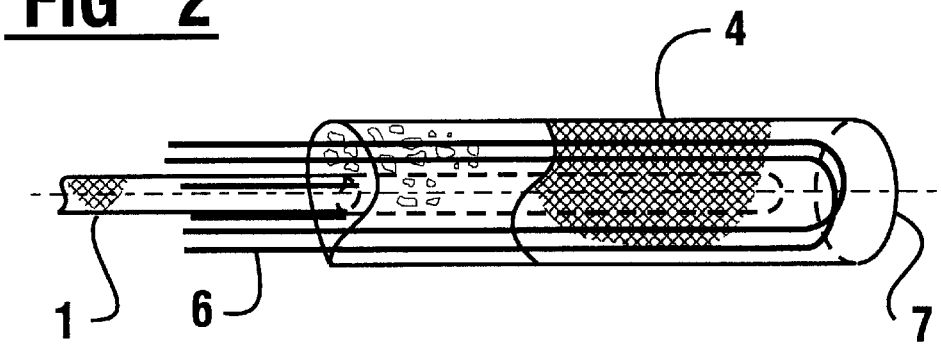
FIG. 2: a perspective view of the end of an injection body.

FIG. 2 shows a variation of an embodiment example in accordance with FIG. 1. In this case, the reinforcing elements 6, here in the shape of wires, bars or rods, are bent into a U-shape at one end 7 and extend over substantially the entire length of the injection body.

FIG. 3 shows a number of different embodiments of the reinforcing elements. Thus, FIG. 3a shows a deformed rod. The deformations can be made on a section-by-section basis or can be provided over the entire length. The reinforcing elements may differ in length.

Figure 3A:
FIG. 3A shows a deformed reinforcing element.
Figure 3B:
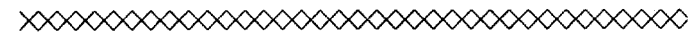
FIG. 3B shows a ridged sheet metal reinforcing element.

FIG. 3B shows a length of ridged sheet metal in the form of a narrow strip.

Figure 3C:
FIG. 3C shows a corrugated pipe or rod reinforcing element.

FIG. 3C shows a corrugated pipe or a corrugated rod.

Figure 3D:
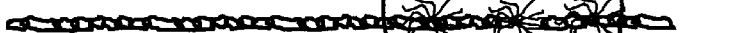
FIG. 3D shows a reinforcing element of twisted material.

FIG. 3D shows twisted wires, into which steel wool 8 or other materials can be twisted. This arrangement permits an intensive and interlocking connection with the injected mortar, the result of which being that forces can be readily taken up from the construction structure by the injection body and transferred onward.

Figure 3E:
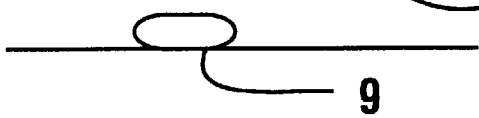
FIG. 3E shows a smooth reinforcing element.
Figure 4E:
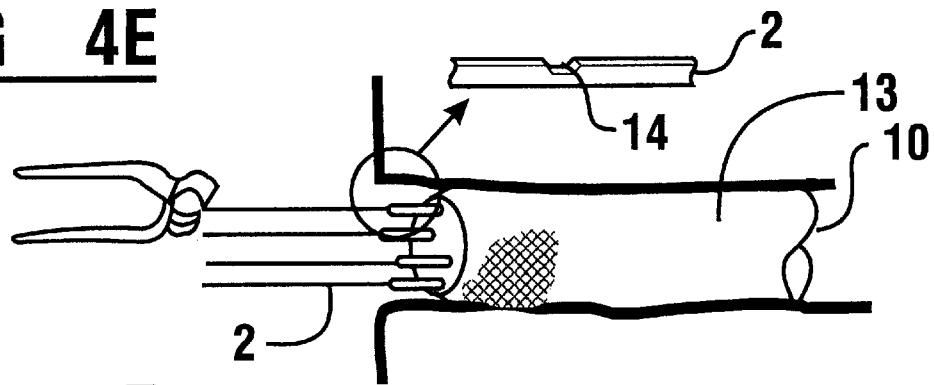
FIG. 4E shows reinforced elements with break points.
Figure 4F:
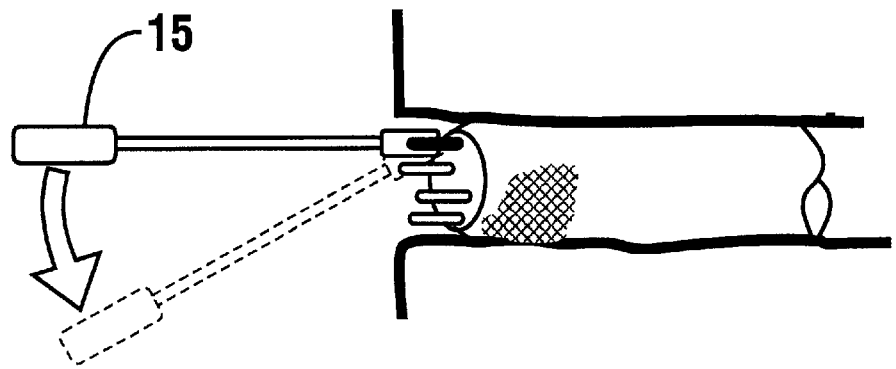
FIG. 4F shows testing a reinforced elements with a tool.
Figure 4G:
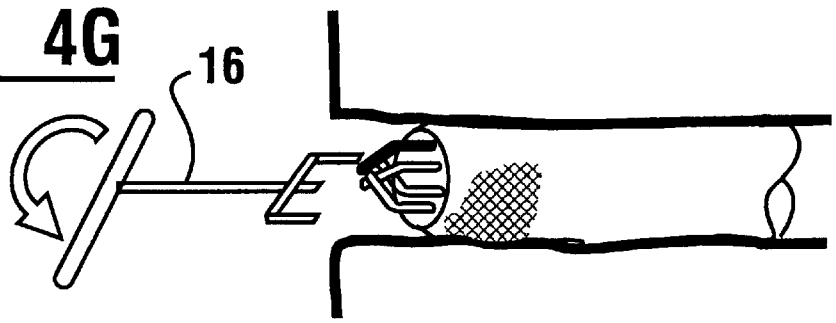
FIG. 4G shows reinforced elements bent with a tool.
Figure 4H:
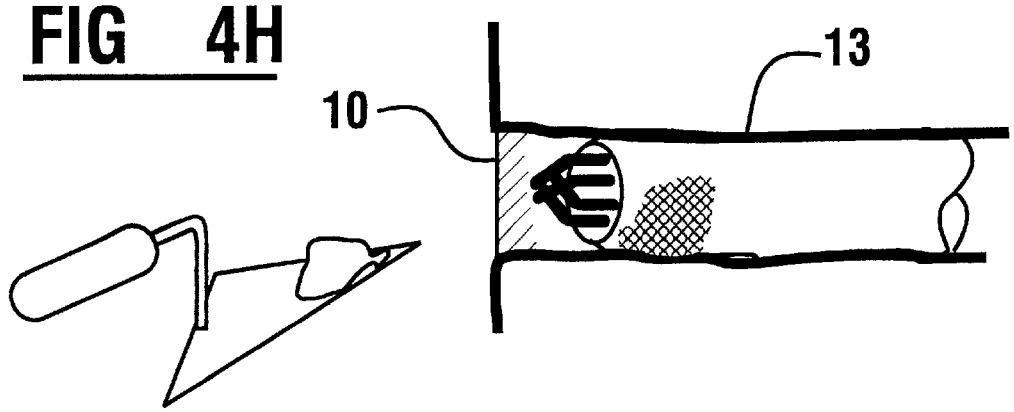
FIG. 4H shows a final stage of sealing a borehole having an injection body.

FIG. 3E illustrates a smooth piece of steel 9 with a loop for attachment.

The reinforcing elements shown in FIGS. 3A to 3E and alternative types of reinforcing elements can be employed in any combination in accordance with local objectives.

FIGS. 4A to D show the individual phases of the injection process.

In accordance with FIG. 4A, featured in construction structure 11 is a borehole 10 that is filled in by means of an injection body in accordance with the invention, in order for example to direct forces away from stress fields. Once the objective has been identified, the most suitable injection body for the task is selected, the reinforcing elements, their type, size and number are chosen on site and inserted into borehole 10. Next, as shown in FIG. 4B, mortar is poured in, and the inner filling-or-fabric tube is expanded up to a larger size. Thus, the reinforcing elements 2 as well assume generally their final location and predetermined position. It is thus ensured that even the predetermined distribution of the reinforcing elements is maintained. After having reached the end of the filling-or-fabric tube 1, the mortar flows from the open end of the latter, and is guided by means of the outer fabric tube 4 in the opposite direction as indicated by arrows 12, preferably until it reaches the entrance, as can be seen in FIG. 4D. Since the outer fabric tube in the described embodiment has sufficient elasticity, the borehole is generally completely filled in, the fabric pressing tightly against the wall of the borehole. If the fabric tube has attained its full expansion and there remain uneven regions inside the borehole into which the fabric is unable to expand, the mortar in the described embodiment is capable of pressing through the mesh of the tube to fill in the unevenness. Forces arising in such regions are thus readily taken up by the injection body and either distributed or transferred.

FIGS. 4E to H show the final assembly stages of an injection body 13, which, already occupying a borehole 10 and filled with mortar, has reinforcing bars 2, each of which features at its end a predetermined breaking point 14. This arrangement in the described embodiment permits the reinforcing elements 2, which protrude from borehole 10, to be tested and broken by means of a simple tool 15 and bent together by means of another tool 16 (see FIG. 4G), so that the reinforcing elements are frictionally clamped or tightened by means of a clamping device and thus are connected together, so that the filling out and sealing of the borehole will have both sufficient support and attachment to the injection body (see FIG. 4H).

Figure 5A:
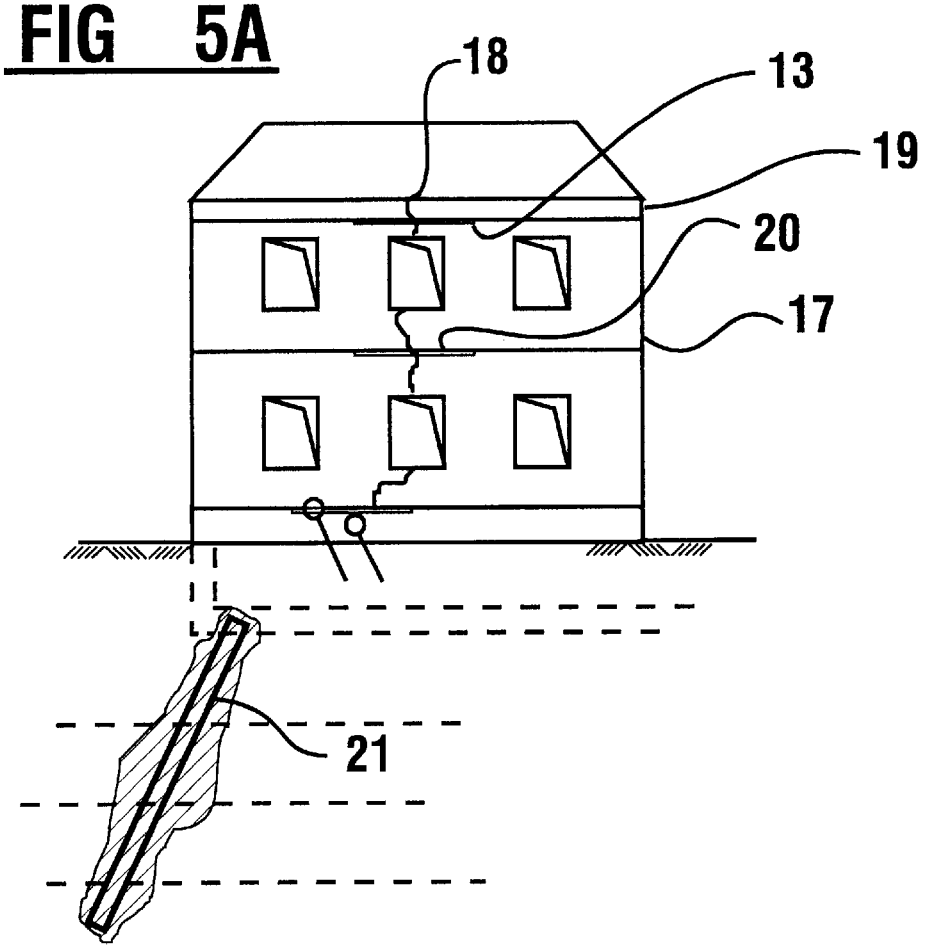
FIG. 5A shows an injection body constructed as an annular anchor.

FIGS. 5A and B show further application examples of the present invention.

In this arrangement, a building 17 features vertically-running settling cracks 18, the stresses causing which are to be taken up and distributed with the assistance of the injection body of the present invention. For this purpose, injection body 13 is constructed as an annular anchor 19 having a variety of different reinforcing elements. Thus, annular anchor 19 has a thicker construction 2D in the region of the cracks 18, while the remaining regions of the anchor are less strongly reinforced. The annular anchor has different cross sections and a ministake 21, used as a support, which can be grouted in two stages.

In the example shown, the cracks 18 of building 17 have arisen due to different subsoils. While the right side of the house rests on solid soil, the soil has sunk underneath the left-hand part, a condition which necessitates stabilization. The proposed injection body can also be used in this situation. The mortar, which flows back following filling of the injection body, is prevented from exiting by means of an annular plate 5 or other suitable device, preferably located adjacent the head part, whereby additional mortar is injected in a second pressure state at, for example 10 bar, the result of which being that the outer fabric sleeve expands further, thus solidifying the subsoil and improving pile stability. It is proposed that the outer fabric sleeve feature, depending on soil solidity, varying expansion radii along the length of its axis. Thus, for example, the lower portion of the outer sleeve can be pear-shaped, a shape that is particularly suitable for piles and soils into which piles are driven. Alternatively other selected shapes and locations desirable under the circumstances may be achieved.

Figure 5B:
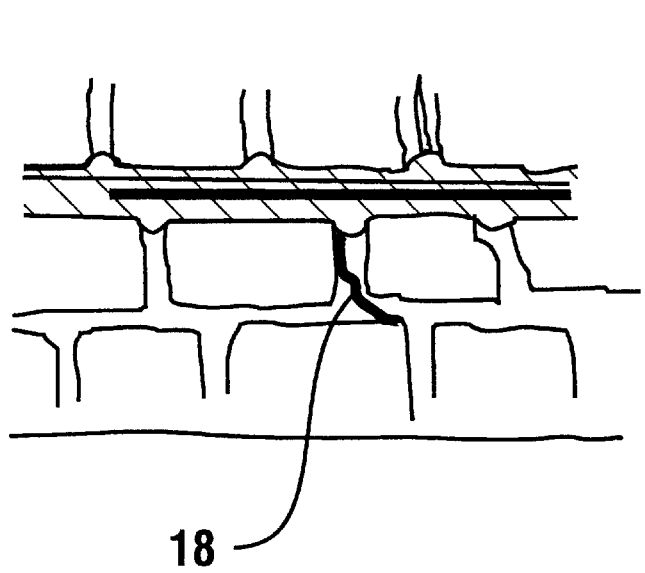
FIG. 5B shows an injection body inserted into a crack in a wall.
Figure 5C:
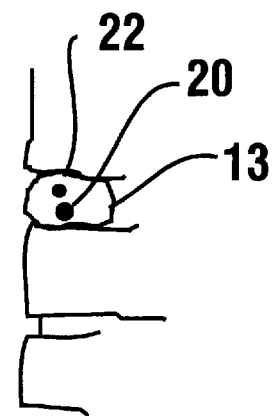
FIG. 5C shows a section from FIG. 5B.

FIG. 5B shows an enlarge view of a wall structure, which is split by a vertical crack 18. FIG. 5C shows a section of this situation. Injection anchor 13 of this embodiment has a stronger construction in the region of the crack 18, while the remaining region of the annular anchor is provided with a basic reinforcement 22. This method achieves more effective reinforcement.

Thus the injection anchor of the present invention achieves the above stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations given are by way of examples and the invention is not limited to the exact details shown or described.

In the following claims any feature described as a means for performing a function shall be construed as encompassing any means capable of performing the recited function, and not mere equivalents of the particular means described in the foregoing description.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A body for the transfer of mechanical stresses in structures in above-ground or below-ground construction, and for insertion into a borehole, slit, or opening, comprising:

a central filling tube extending generally along an axis, wherein the filling tube comprises an inner fabric stocking having an open end adapted to receive a filler material;

at least one outer fabric stocking extending along the axis and about the filling tube in generally surrounding relation;

at least one reinforcing element, wherein the at least one reinforcing element comprises at least one of a wire, rod, pipe, or metal strip, wherein the at least one reinforcing element is adapted to be arranged on site in a generally axis-parallel position between the inner and outer fabric stockings, and wherein the at least one reinforcing element extends on the outside of the inner fabric stocking and is operatively connected to the outer fabric stocking such that upon filling the filling tube with the filler material the at least one reinforcing element remains in position.

2. An injection body for insertion into an opening, comprising a centrally-arranged inner fabric stocking having an open end, wherein the body is adapted to receive a filler material through the open end;

an outer fabric stocking arranged along the inner fabric stocking in surrounding relation about the inner fabric stocking; and at least one reinforcing element comprising a wire, rod, pipe, or metal strip, wherein the at least one reinforcing element is adapted to be arranged along the inner fabric stocking between the inner and outer fabric stockings.

3. The injection body according to claim 2, wherein the fabric stockings comprise expandable mesh.

4. The injection body according to claim 2, wherein the inner fabric stocking is shorter in length than the at least one reinforcing element.

5. The injection body according to claim 2, wherein the at least one reinforcing element has a U-shape, the bend of which is arranged at an end of the body opposite from the open end.

6. The injection body according to claim 2, comprising a plurality of reinforcing elements, wherein the reinforcing elements are deformed at predetermined locations over a predetermined length in such a way that each deformed reinforcing element is corrugated or twisted in defined regions and are attached to steel or glass wool.

7. A method of installing the injection body recited in claim 2, comprising the steps of:
(a) arranging the outer fabric stocking along the inner fabric stocking in surrounding relation about the inner fabric stocking;
(b) arranging the last at least one reinforcing element along the inner fabric stocking between the inner and outer fabric stockings;
(c) inserting the body into the opening; and
(d) filling the body with a filler material through the open end.

8. The injection body according to claim 3, wherein the fabric stockings comprise expandable metallic mesh.

9. The injection body according to claim 2, wherein the at least one reinforcing element is arranged between the inner and outer fabric stockings.

10. The injection body according to claim 9, wherein the body has an axis, wherein the at least one reinforcing element is arranged in a generally axis-parallel position along the inner fabric stocking between the inner and outer fabric stockings.

11. The injection body according to claim 2, wherein the body has an axis, and wherein the outer fabric stocking is arranged in a generally axis-parallel position along the inner fabric stocking.

12. The injection body according to claim 2, wherein the body is adapted to transfer stresses or loads in structures in above-ground or below-ground construction, wherein the opening comprises a borehole, slit, or crack, and wherein the body comprises a filler material inserted through the open end.

13. The injection body according to claim 2, wherein the outer fabric stocking is closed at an end opposite the open end.

14. The injection body according to claim 2, further comprising an endplate attached at an end of the body, wherein the endplate comprises an a center bore, and wherein the open end is attached to the endplate along the periphery of the center bore.

15. An injection body for insertion into an opening, comprising
a centrally-arranged inner fabric stocking having an open end, wherein the body is adapted to receive a filler material through the open end;
an outer fabric stocking arranged along the inner fabric stocking in surrounding relation about the inner fabric stocking;
a plurality of reinforcing elements, wherein the plurality of reinforcing elements are deformed over at least a part length, and wherein each said deformed reinforcing element differs in length from another deformed reinforcing element;
at least one reinforcing element comprising a wire, rod, pipe, or metal strip, wherein the at least one reinforcing element is adapted to be arranged along the inner fabric stocking between the inner and outer fabric stockings.

16. An injection body for insertion into an opening, comprising
a centrally-arranged inner fabric stocking having an open end, wherein the body is adapted to receive a filler material through the open end;
an outer fabric stocking arranged along the inner fabric stocking in surrounding relation about the inner fabric stocking;
a plurality of reinforcing elements, wherein the reinforcing elements are clamped or tightened together by means of a clamping device, whereby the clamped or tightened reinforcing elements comprise a predetermined breaking point for determining a load that can be supported by the body;
at least one reinforcing element comprising a wire, rod, pipe, or metal strip, wherein the at least one reinforcing element is adapted to be arranged along the inner fabric stocking between the inner and outer fabric stockings.

17. An injection body for insertion into an opening, comprising
a centrally-arranged inner fabric stocking having an open end, wherein the body is adapted to receive a filler material through the open end;
an outer fabric stocking arranged along the inner fabric stocking in surrounding relation about the inner fabric stocking;
a plurality of reinforcing elements, wherein the reinforcing elements at attached at an end of the body to an endplate, wherein the endplate is adapted for attachment to a vibrating device such that vibrations produced can be transferred to the reinforcing elements;
at least one reinforcing element comprising a wire, rod, pipe, or metal strip, wherein the at least one reinforcing element is adapted to be arranged along the inner fabric stocking between the inner and outer fabric stockings.

* * * * *

UNITED STATES PATENT AND TRADEMARK OFFICE
CERTIFICATE OF CORRECTION

PATENT NO. : 6,189,281 B1
DATED : February 20, 2001
INVENTOR(S) : Peter Sobek

It is certified that error appears in the above-identified patent and that said Letters Patent is hereby corrected as shown below:

Col. 7, line 25, delete the word "last".

Signed and Sealed this

Fifth Day of June, 2001

*Attest:*

*Attesting Officer*

NICHOLAS P. GODICI
*Acting Director of the United States Patent and Trademark Office*